United States Patent

Togawa

[19]

[11] Patent Number: 5,857,200
[45] Date of Patent: Jan. 5, 1999

[54] DATA RETRIEVING APPARATUS USED IN A MULTIMEDIA SYSTEM

[75] Inventor: Yoshifusa Togawa, Kawasaki, Japan

[73] Assignee: Fujitsu Limited, Kawasaki, Japan

[21] Appl. No.: 604,605

[22] Filed: Feb. 21, 1996

[30] Foreign Application Priority Data

Feb. 21, 1995 [JP] Japan .................................. 7-031977

[51] Int. Cl.⁶ .................................................. G06F 17/00
[52] U.S. Cl. ............................................. 707/104; 707/2
[58] Field of Search ................................. 395/603, 606, 395/607, 777, 611, 615; 707/2, 104

[56] References Cited

U.S. PATENT DOCUMENTS

| | | | |
|---|---|---|---|
| 4,744,050 | 5/1988 | Hirosawa et al. | 364/900 |
| 5,325,091 | 6/1994 | Kaplan et al. | 341/31 |
| 5,375,235 | 12/1994 | Berry et al. | 395/600 |
| 5,542,090 | 7/1996 | Henderson et al. | 395/600 |
| 5,576,954 | 11/1996 | Driscoll | 395/603 |

FOREIGN PATENT DOCUMENTS 3-260869  11/1991  Japan .
6-168270  6/1994  Japan .

*Primary Examiner*—Thomas G. Black
*Assistant Examiner*—Donald Min
*Attorney, Agent, or Firm*—Staas & Halsey

[57] ABSTRACT

A data retrieving apparatus is used in a multimedia system which includes a processing device, a data storage device, an input device, a display device, and a sound output device. The data storage device includes a retrieving object data storage unit, an occurrence frequency storage unit and a next occurrence position storage unit. The processing device includes a retrieving information input unit, a minimum occurrence frequency detecting unit, a retrieval processing unit and a retrieving result output unit. The retrieving object data includes any one or more of animated picture sound or still picture data, and sets of these data and character text data. Each of said animated picture sound or still picture data includes managing information formed by a character-string having a title or comments. The occurrence frequency of characters or words is included in the retrieving object data with a first occurrence position of each of the characters or words.

6 Claims, 11 Drawing Sheets

OCCURRENCE FREQUENCY TABLE                                    22

| WORD | FIRST OCCURRENCE POSITION | OCCURRENCE FREQUENCY |
|---|---|---|
| a | A 5 | 3 |
| went | A 10 | 2 |
| grandpa | A 9 | 1 |
| grandma | A 16 | 1 |
| long | A 1 | 2 |

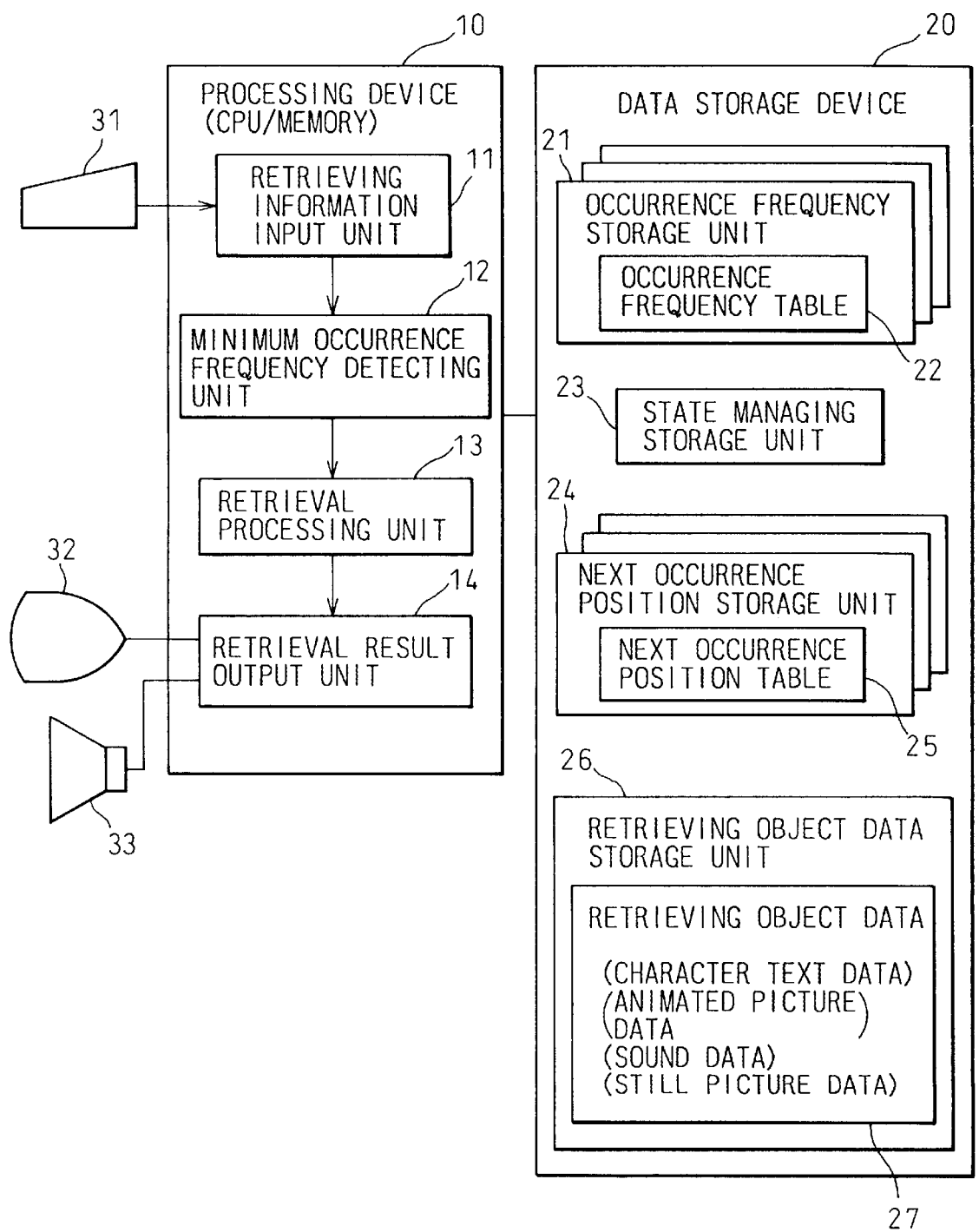

OCCURRENCE FREQUENCY TABLE 22

| WORD | FIRST OCCURRENCE POSITION | OCCURRENCE FREQUENCY |
|---|---|---|
| a | A5 | 3 |
| went | A10 | 2 |
| grandpa | A9 | 1 |
| grandma | A16 | 1 |
| long | A1 | 2 |

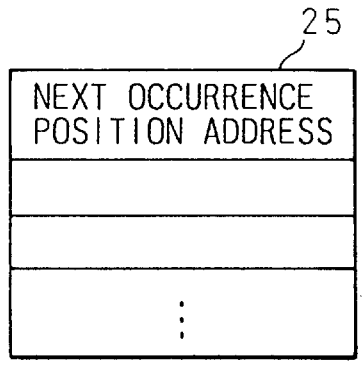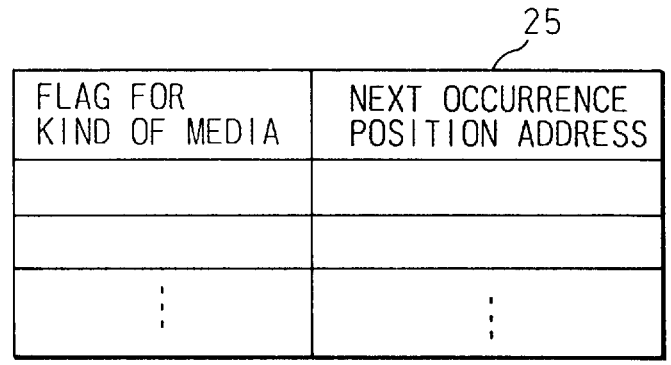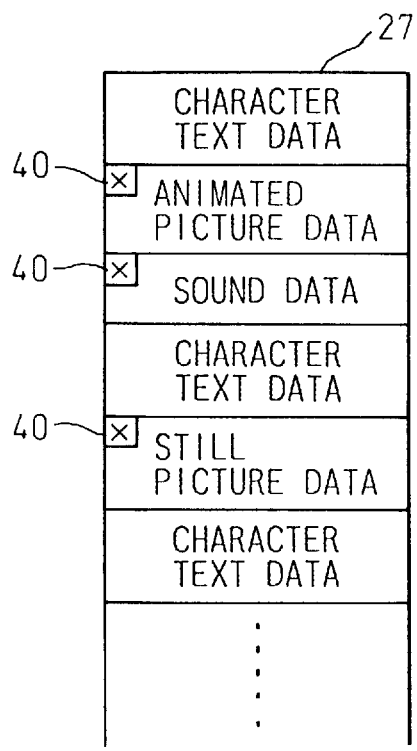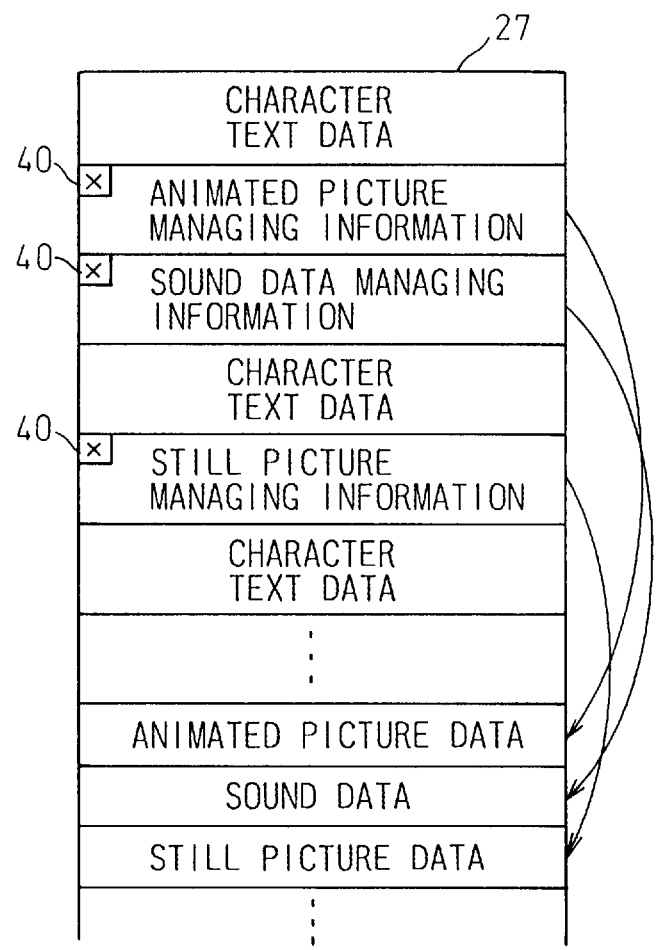

Fig. 6

| | | RETRIEVAL RANGE | | | | | | | | | | | | |
|---|---|---|---|---|---|---|---|---|---|---|---|---|---|---|
| | | A | B | C | D | E | F | G | H | I | J | K | L | M | N |
| RETRIEVING OBJECT | CHARACTER TEXT DATA | ○ | ○ | | | | | | | | | | | | |
| | CHARACTER-STRING IN ANIMATED PICTURE DATA | ○ | | ○ | ○ | | ○ | ○ | | | | | | | |
| | COMMENT IN ANIMATED PICTURE DATA | ○ | | ○ | | ○ | ○ | | ○ | | | | | | |
| | CHARACTER-STRING IN SOUND DATA | ○ | | ○ | ○ | | | | | ○ | ○ | | | | |
| | COMMENT IN SOUND DATA | ○ | | ○ | | ○ | | | | ○ | | ○ | | | |
| | CHARACTER-STRING IN STILL PICTURE DATA | ○ | | ○ | ○ | | | | | | | | ○ | ○ | |
| | COMMENT IN STILL PICTURE DATA | ○ | | ○ | | ○ | | | | | | | | ○ | ○ |

Fig. 7

| A | B | C | D | E | F | G | | N |
|---|---|---|---|---|---|---|---|---|
| 0/1 | 0/1 | 0/1 | 0/1 | 0/1 | 0/1 | 0/1 | ---- | 0/1 |

23

0 : ABSENCE OF OCCURRENCE FREQUENCY TABLE/
    NEXT OCCURRENCE POSITION TABLE
1 : PRESENCE OF OCCURRENCE FREQUENCY TABLE/
    NEXT OCCURRENCE POSITION TABLE

DATA RETRIEVING APPARATUS USED IN A MULTIMEDIA SYSTEM

BACKGROUND OF THE INVENTION

1. Field of the Invention

The present invention relates to a data retrieving apparatus used in a multimedia system for efficiently retrieving data (below, multimedia data) which include character text data, animated picture data, sound data, still picture data, etc., by using a character-string which is provided by a user.

2. Description of the Related Art

Recently, storage media having large memory capacity, (for example, a CD-ROM, an optical-magnetic disk, etc.) have been widely utilized in various fields, and particularly, in multimedia systems. Accordingly, by utilizing such a storage medium having large memory capacity, it is relatively easy to structure a multimedia database which stores not only character text data, but also the animated picture data for an animation, the sound data for a voice and music, the still picture data for an illustration, etc.

On the other hand, many kinds of retrieval methods are provided for retrieving the character text data. Further, for the multimedia data, the user always requires a simplified and quick method for retrieving the multimedia data. Accordingly, the present invention aims to provide a simplified and quick method for retrieving the multimedia data.

In a conventional art, there are two representative methods for retrieving the character text data. One is a direct retrieving method in which text matching user supplied character string input is retrieved from the entire text of data; the other is a retrieving method for retrieving keywords which match the particular character-string provided by the user, and retrieving the text data using the keywords.

In the latter method, an index is previously provided by extracting important words from the text data as the keywords, and retrieving the keyword, which match the character-string provided by the user, from the index. The former is called "an all-context retrieving method", and the latter is called "a keyword retrieving method".

Further, in general, the all context retrieving method has an advantage which the user can freely select the character-string to be retrieved. However, since it is necessary to retrieve the character string, which matches the character-string provided by the user, by comparing the character-string with the text data for every character, a lot of time is required for retrieving only one character string when this method is executed.

On the other hand, the keyword retrieving method has an advantage which the user can quickly retrieve the character-strings compared to the all text retrieving method, but has a disadvantage which the user cannot freely input the character-string to be retrieved since kinds of words to be retrieved are restricted.

SUMMARY OF THE INVENTION

The object of the present invention is to provide a data retrieving apparatus enabling high speed retrieval of multimedia data including character text data, animated picture data, sound data, still picture data, etc., based on a character-string input by a user.

In accordance with the present invention, there is provided a data retrieving apparatus used in a multimedia system including a processing device, a data storage device, an input device, a display device, and a sound output device; and the data storage device comprising:

a retrieving object data storage unit for storing retrieving object data which includes any one or more animated picture/sound/still picture data, and set of these data and character text data; and each of said animated picture/sound/still picture data including managing information formed by a character-string having a title or comments;

an occurrence frequency storage unit for storing occurrence frequency of characters or words included in the retrieving object data and a first occurrence position of each of characters or words; and a next occurrence position storage unit for storing next occurrence position of each of characters or words;

further, the processing device comprising:

a retrieving information input unit for receiving the character-string to be retrieved from the input device;

a minimum occurrence frequency detecting unit operatively connected to the retrieving information input unit for detecting a character or word having a minimum occurrence frequency in the character-string by referencing the occurrence frequency storage unit;

a retrieval processing unit operatively connected to the detecting unit for sequentially obtaining the occurrence position in the retrieving object data as to the character or word detected by the minimum occurrence frequency detecting unit from the occurrence frequency storage unit or next occurrence position storage unit, verifying the character-string positioned after and before the occurrence position with the character-string to be retrieved, and retrieving any one of the character text data, the animated picture data, the sound data, and the still picture data; and a retrieving result output unit operatively connected to the processing unit for outputting the retrieved character text data, the animated picture data, the sound data, or the still picture data, in accordance with the kind of media.

In a preferred embodiment, several kinds of the occurrence frequency storage unit and next occurrence position storage unit are provided in accordance with kinds of data, kinds of managing information, or sets of these data; and the minimum occurrence frequency detecting unit and retrieval processing unit selecting one of the occurrence frequency storage units and next occurrence position storage units from the plural kinds in accordance with a designated retrieval range.

In another preferred embodiment, the data storage device further comprises a state managing storage unit for managing the presence or absence of the occurrence frequency storage unit and next occurrence position storage unit corresponding to kinds of data, kinds of managing information, or sets of these data; and the minimum occurrence frequency detecting unit and retrieval processing unit select one of the occurrence frequency storage unit and next occurrence position storage unit from the plural kinds in accordance with the designated retrieval range and managing information of the state managing storage unit.

In still another preferred embodiment, the managing information attached to the sound data includes data expressed by characters describing the contents of the sound; and the retrieval result outputting unit outputs the sound data to the sound output device when the retrieval result includes the data expressed by characters as to the contents of the sound.

In still another preferred embodiment, the retrieving object data storage unit stores the animated picture data, the sound data or the still picture data in accordance with an order of occurrence frequency in the retrieving object data formed by one consecutive storage area.

BRIEF DESCRIPTION OF THE DRAWINGS

FIG. 1 shows a basic structure of the present invention;

FIGS. 3A and 3B show basic structures of the next occurrence position table of the present invention;

FIGS. 4A and 4B show examples of retrieving object data;

FIG. 6 is an explanatory view of a retrieval range of the present invention;

FIG. 7 shows one a structural example of a state managing storage unit 23 of the present invention;

DESCRIPTION OF THE PREFERRED EMBODIMENTS

Figures 2A, 2B:
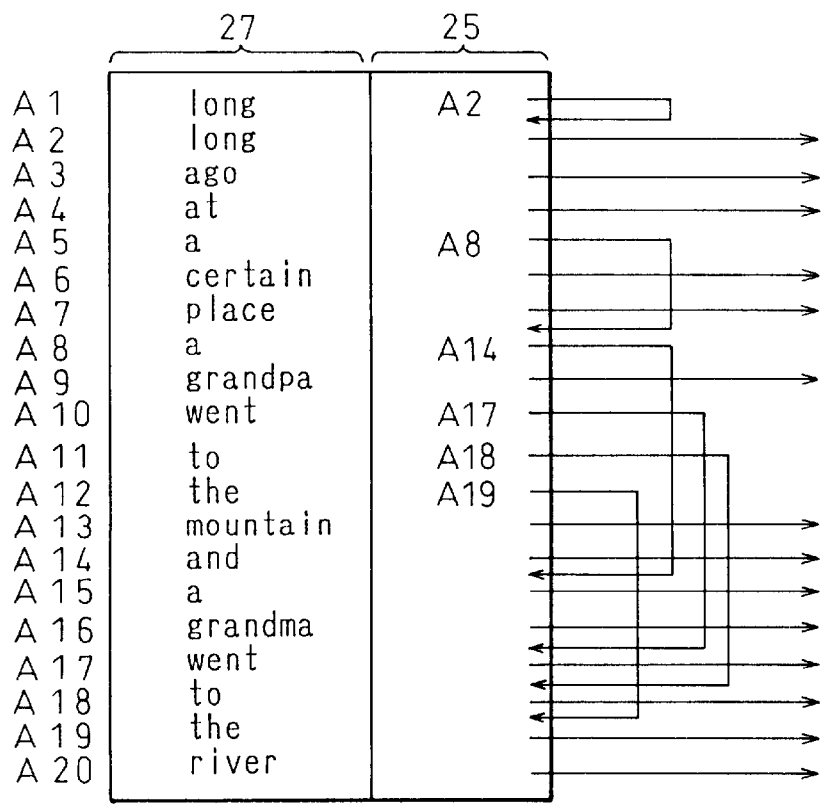
FIG. 2A is an explanatory view of an occurrence frequency table of the present invention as shown in FIG. 1.
FIG. 2B is an explanatory view of a next occurrence position table of the present inventions as shown in FIG. 1.

FIG. 1 shows a basic structure of the present invention. In FIG. 1, reference number 10 denotes a processing device including a CPU and a memory, 20 a data storage unit including a CD-ROM and an optical-magnetic disk, 31 an input device including a keyboard and mouse, 32 a display device, and 33 a sound output device including a speaker.

The data storage device 20 includes a data storage unit 26 for storing data to be retrieved (below, retrieving object data 27), for example, the character text data, the animated picture data, the sound data, the still picture data, etc. In the retrieving object data 27, managing information, which include titles, sentences and comments, are added to each of animated picture data, sound data and still picture data.

Further, the data storage device 20 includes a storage unit 21 for storing occurrence frequency of data (below, an occurrence frequency storage unit) and a storage unit 24 for next occurrence position of data (below, a next occurrence position storage unit). Still further, the data storage device 20 may include a state managing storage unit 23.

The occurrence frequency storage unit 21 includes an occurrence frequency table 22 for storing the occurrence frequency of each character and each word corresponding to first occurrence position thereof. The next occurrence position storage unit 24 includes a next occurrence position storage table 25 for storing the next occurrence position of the same character and the same word.

The processing device 10 includes a retrieving data input unit 11, a minimum occurrence frequency detecting unit 12, a retrieval processing unit 13 and a retrieval result output unit 14.

The retrieving data input unit 11 receives the character-string to be retrieved and a range to be searched from the input device 31.

The minimum occurrence frequency detecting unit 12 refers to the occurrence frequency table 22 when the character-string to be retrieved is input, and extracts the character or word having the minimum occurrence frequency within the character-string to be retrieved.

The retrieval processing unit 13 sequentially retrieves the occurrence position of the character or word, which is extracted by the minimum occurrence frequency detecting unit 12, at the retrieving object data 27 from the occurrence frequency table 22, next (after this step), from the next occurrence position table 25. Further, the retrieval processing portion 13 verifies the character-string before and after occurrence position with the character-string to be retrieved, and retrieves any one of the character text data, the animated picture data, the sound data, or the still picture data.

The retrieval result output unit 14 outputs the character text data, the animated picture data, the sound data, or the still picture data, which are retrieved by the retrieval processing unit 13, to the display device 32 or the sound output device 33 in accordance with a kind of the multimedia.

The data storage device 20 may provide several kinds of occurrence frequency tables 22 and next occurrence position tables 25 in accordance with the kind of the multimedia or of the management data attached thereto and set of above data. In this case, the minimum occurrence frequency detecting unit 12 and the retrieval processing unit 13 select the occurrence frequency table 22 and the next occurrence position table 25 in accordance with the designated search range which is input from the input unit 31 through the retrieval information input unit 11.

Further, the state managing storage unit 23 is provided for the managing presence or absence of data in the occurrence frequency table 22 and the next occurrence position table 25 in accordance with the kind of the multimedia or of the management data attached thereto and set of above data. Still further, the minimum occurrence frequency detecting unit 12 and the retrieval processing unit 13 may select the occurrence frequency table 22 and the next occurrence position table 25 to be used in accordance with the designated retrieval range and the managing data in the state managing storage unit 23.

When the retrieving object data 27 is sound data, it is possible to retrieve the sound data using the character or the word by inputting character data which is obtained from the contents of the sound within the managing data, for example, comments, attached to the sound data.

When the retrieval result is the sound data including the character data obtained from the contents of the sound, the retrieval result output unit 14 outputs the sound data to the sound output device 33.

For example, the animated picture data, the sound data, or the still picture data to be retrieved is held in the retrieving object data 27 consisting of one continuous area in the order of the occurrence.

Briefly, in FIG. 1, the retrieving data input unit 11 receives the character-string to be retrieved from the user, and passes it to the minimum occurrence frequency detecting unit 12. The minimum occurrence frequency detecting unit 12 refers to the occurrence frequency table 22 and extracts the character (or word) having the minimum occurrence frequency in the character-string to be retrieved.

The retrieval processing unit 13 sequentially obtains an address of the occurrence position of the character (or word) from the occurrence frequency table 22 or the next occurrence position table 25, and reads the character-string before and after the address from the retrieving object data storage unit 26. Further, the retrieval processing unit 13 compares the extracted character-string with the input character-string, and retrieves the character text data including the character-string coinciding with the input character-string, the character-string of the animated picture/sound/still picture data, or data including the character-string of the comment. Still further, the retrieval processing unit 13 reads the multimedia to be retrieved based on the retrieval result, and outputs it to the display device 32 or the sound output device 33.

In accordance with the above explained retrieval, according to the invention defined in claim 1, as well as the before mentioned "all context retrieving method", it is possible to retrieve various kinds multimedia data based on the selected character-string. Further, since the user retrieves the multimedia data in accordance with the character-string or words having small occurrence frequency, it is possible to raise the retrieving speed. Particularly, when the occurrence frequency table 22 and the next occurrence position table 25 are prepared based on words, not characters, it is possible to effectively raise the retrieving speed for a text which is written in a foreign language (English, German, French, etc.).

Further, according to the invention defined in claim 2, it is possible to perform the high speed retrieval in accordance with a retrieval range designated by, the animated picture data, the sound data, the still data, set of these media, or set of comments and titles.

Still further, according to the invention defined in claim 3, since it is possible to restrict the occurrence frequency table 22 and the next occurrence position table 25 necessary for the system by using the state managing storage unit 23, it is possible to reduce the amount of data which was previously provided in order to retrieve.

Still further, according to the invention defined in claim 4, it is possible to retrieve the contents of the sound data and to listen the result of the retrieval from the sound output device 33.

Still further, according to the invention defined in claim 5, since the animated picture/sound/still picture data are provided in the retrieving object data 27, it is not necessary to manage a storage area compared to a process which only multimedia data is separately stored in another area, and to easily prepare the storage medium, for example, the CD-ROM. Further, since it is not necessary to access a position which is far away from where the retrieved character-string exists in the retrieving object data 27, it is possible to considerably raise the display speed from the retrieving operation for the animated picture/sound/still picture data to the display operation.

FIG. 2A is an explanatory view of the occurrence frequency table in FIG. 1, and FIG. 2B is an explanatory view of the next occurrence position table shown in FIG. 1.

In FIG. 2A, for example, it is assumed that there is a character text data "long long ago, at a certain place, a grandpa went to the mountain and a grandma went to the river, . . ." as the retrieving object data 27. The occurrence frequency table 22 and the next occurrence position table 25 are previously provided as follows. In the table, each of A1, A2, . . . , A20 denotes an address which indicates the occurrence position of each word in the retrieving object data 27.

The occurrence frequency table 22 records the address of the first occurrence position and the occurrence frequency corresponding to each word. For example, since the first occurrence position of the word "a" is indicated by the address A5, the address A5 is written in the corresponding entry. Further, since the word "a" is occurred at three times in the above text data, the occurrence frequency "3" is written in the corresponding entry. In this embodiment, all commas "," are ignored when determining the address in order to clarify the explanation.

In FIG. 2B, the next occurrence position table 25 records the address of the same word which occurs next in the retrieving object data 27. For example, the first address of the word "a" is the address A5 as shown in the occurrence frequency table 22, and the next address of the same is "A8" as shown by the second entry in the next occurrence position table 25. Further, the following occurrence of the word "a" is given by the address "A114". As shown by arrow lines, the next occurrence frequency table 25 stores the information connected in chain-like lines regarding the same word.

For example, when the character-string "a grandma" is provided by a user as the retrieving object data (i.e., as the character-string to be retrieved), first, the minimum occurrence frequency detecting unit 12 refers to the occurrence frequency table 22, and finds the word having the smaller occurrence frequency between "a" and "grandma". In this example, since the occurrence frequency of the word "a" is three times and that of the word "grandma" is one time as shown in the occurrence table 22, the word "grandma" is used as the retrieval object.

The retrieval processing unit 13 detects that the address of the first occurrence of the character "grandma" is "A16" from the occurrence frequency table 22. Next, the retrieval processing unit 13 retrieves the character-string just before and after the character "grandma", i.e., "—a grandma went—" in the retrieving object data 27, and checks whether this character-string "a grandma went" includes the character-string "a grandma" to be retrieved.

In this example, as is obvious from above, since the character-string "a grandma went" includes the character-string "a grandma", the retrieval processing unit 13 completes the retrieval.

The above explained examples represent only the character text data. Further, in the following example, the object (or target) of the retrieval is directed to multimedia data including animated picture/sound/still picture data. In the following embodiment, the occurrence frequency table 22 and the next occurrence position table 25 are prepared based on the character. Further, it is possible to realize these tables based on a set of plural characters, i.e., a word.

In this embodiment, the basic structure of the occurrence frequency table 22 is the same as FIG. 2A. That is, as shown in FIG. 2A, the occurrence frequency table 22 stores the address of the first occurrence position and the occurrence frequency corresponding to each word.

FIGS. 3A and 3B show basic structures of the next occurrence position table. In FIG. 3A, the retrieving object table 25 is simply structured by the next occurrence position address. In FIG. 3B, the retrieving object table 25 is structured by the next occurrence position addresses and sorting flags each corresponding to the address. In this case, the sorting flag represents the kind of multimedia, i.e., any one of character text data, animated picture data, sound data and still picture data.

FIGS. 4A and 4B show examples of the retrieving object data. In FIG. 4A, the retrieving object data 27 includes the character text data consisting of character-codes, the animated picture data, the sound data and the still picture data. These data are mixed with each other. That is, the animated/sound/still picture data are provided in the retrieving object data 27.

In this case, managing information is added to each head of a real data which indicates code-suppressed data of the animated picture data, the sound data and the still picture data. Further, a start character (see reference number 40 in FIG. 4A) consisting of a particular character code (for example, "STC X'FF'" in FIG. 11) is added to each head of the animated picture data, the sound data and the still picture data in order to distinguish it from a normal character text data.

As shown in FIG. 4A, since the character text data, the animated picture data, the sound data and the still picture data are mixed with each other in one retrieving object data 27, it is possible to easily prepare the storage medium, for example, the CD-ROM because these data can be stored at random in the storage medium. Further, it is possible to realize high speed access to the real data at retrieval.

In FIG. 4B, the animated picture data, the sound data and the still picture data are moved (see arrow lines) and collectively stored in a predetermined area. The storage area of these real data is directly pointed out by the data storage unit. In this case, when preparing the storage medium, for example, the CD-ROM, it is necessary to separately manage the storage area between the directly retrieved portion, for example, the character text data, and the animated picture/sound/still picture data.

Figure 5A:
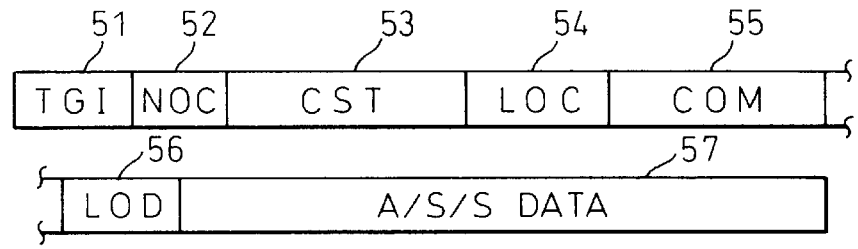
FIG. 5A shows one example of storage format of an animated picture/sound/still picture data corresponding to the retrieving object data of the present invention as shown in FIG. 4A.
Figure 5B:
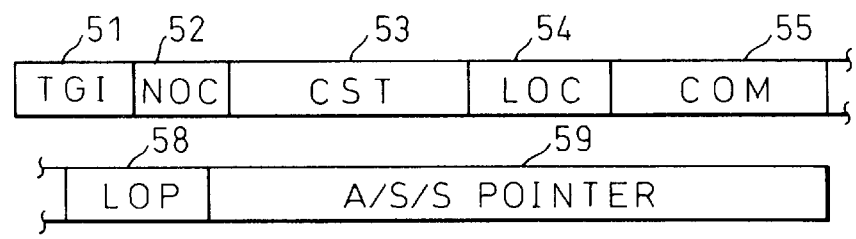
FIG. 5B shows one example of a storage format of the animated picture/sound/still picture data corresponding to the retrieving object data 25 of the present invention as shown in FIG. 4B.
Figure 5C:
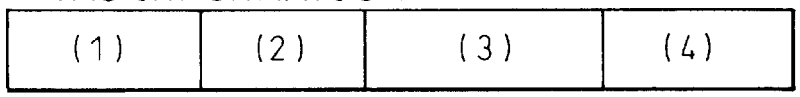
FIG. 5C shows one example of a tag information of a storage format of the present invention as shown in FIGS. 5A and 5B.
Figure 5D:
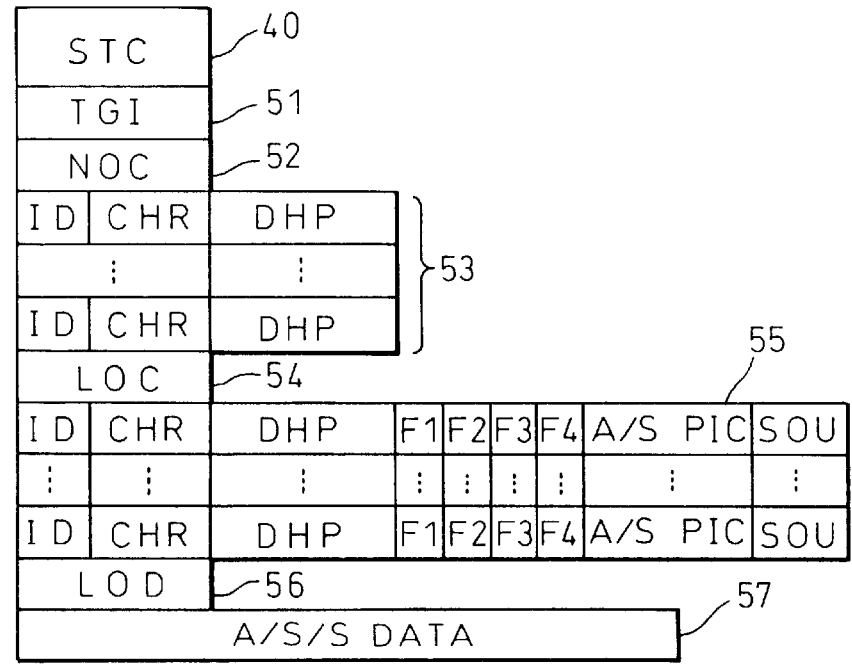
FIG. 5D shows a detailed structure of the storage format of the present invention as shown in FIG. 5A.

FIG. 5A shows one example of a storage format of the animated picture/sound/still picture data corresponding to the retrieving object data shown in FIG. 4A, and FIG. 5B shows one example of a storage format of the animated picture/sound/still picture data corresponding to the retrieving object data 27 shown in FIG. 4B. FIG. 5C shows one example of a tag information of the storage format shown in FIGS. 5A and 5B, and FIG. 5D shows a detailed structure of the storage format shown in FIG. 5A.

In FIG. 5A, one multimedia data, i.e., any one of the animated picture/sound/still picture data, is formed by the tag information (TGI) 51, the number of characters (NOC) 52, the character-string (CST) 53 of the title, etc., the length of the comment (LOC) 54, the comment (COM) 55, the length of data (LOD) 56, and the animated picture/sound/still picture data (real data) (A/S/S DATA) 57. In this format, the managing information of the multimedia data is formed by this format except for the animated picture/sound/still picture data 57.

In FIG. 5B, the length of pointer (LOP) 58 and the animated picture/sound/still picture pointer (A/S/S POINTER) 59 are provided instead of the length of the data (LOD) 56 and the animated picture/sound/still picture data (A/S/S DATA) 57 of FIG. 5A. Other portions (51 to 55) are the same as FIG. 5A.

In FIG. 5C, the tag information 51 shown in FIGS. 5A and 5B is formed by; an identifying information (1) for identifying any one of the animated picture/sound/still picture data; a flag (2) for indicating presence/absence of the comment; a flag (3) for indicating presence/absence of the sound data within the animated picture/still picture data; and a flag (4) for indicating presence/absence of reference of another pointer (that is, this flag indicates that the animated/sound/still picture data exists at another position, i.e., indicates either the storage format shown in FIG. 5A or in FIG. 5B). The tag information can be increased or decreased in accordance with the purpose of the multimedia.

Whether the addition of the length of the comment 54 and the comment 55 are selected for each the animated picture/sound/still picture data is indicated by the flag (2) indicating presence/absence of the comment. For example, as the comment 55, it is possible to set the character-string or the contents of the sound data to utilize the animated picture/sound/still picture data.

In FIG. 5D, this drawing shows the detailed structure of the data storage format shown in FIG. 5A. Following the start character (STC) 40 for the animated picture/sound/still picture (see X'FF' in FIGS. 11), there are the tag information (TGI) 51, the number of the character of the comment (NOC) 52, the character-string of the title 53, the length of the comment (LOC) 54, the comment 55, the length of the data (LOD) 56 and the animated picture/sound/still picture data 57.

The character-string 53 is formed by the identifier flag (ID), the character (CHR) and the data head position (DHP).

Further, the comment 55 is formed by the identifier flag (ID), the character (CHR), the data head position (DHP), flags (F1 to F4), the animated picture/still picture (A/S PIC), and the sound (SOU).

The identifier flag ID provided in the character-string 53 and the comment 55 indicates the presence or absence of the data head position, flags F1 to F4, the animated picture/still picture address, or the sound address. The data head position indicates the head position of the multimedia, i.e., the position of the tag information 51. As shown in FIGS. 5A and 5B, TGI denotes the tag information, NOC denotes the number of character, LOC denotes the length of the comment, and LOD denotes the length of the data.

When the identifier flag ID is "00", there is no head position of the data, and this indicates that the next character is the character.

When the identifier flag ID is "01", there is no information in the head position of the data, and this indicates that there is information on the flags F1 to F4, and the address of the animated picture/still picture, the sound address, or the time information.

When the identifier flag ID is "10", this indicates that there is information on the character and the data head position.

When the identifier flag ID is "11", this indicates that there is information on the character, the flags F1 to F4, the address of the animated picture/still picture, the sound address, or the time information.

In this case, when verifying the character-string to be retrieved, the information of the identifier flag ID is masked and only the character or word is used for a matching operation of verification.

The flag F1 shows the presence/absence of the position information of the animated picture/still picture. When the flag F1 is 0, it indicates that there is no information of the position of the animated picture/still picture. When the flag F1 is 1, it indicates that there is position information for the animated picture/still picture.

The flag F2 shows the presence/absence of the position information of the sound. When the flag F2 is 0, it indicates there is no position information for the sound. When the flag F2 is 1, it indicates that there is position information for the sound.

The flag F3 shows that the position information of the animated picture/still picture represents either an address or a time. When the flag F3 is 0, the position information indicates the address. When the flag F3 is 1, the position information indicates the time.

The flag F4 shows that the position information of the sound represents either the address or the time. When the flag F4 is 0, the position information indicates the address. When the flag F4 is 1, the position information indicates the time.

The address of the animated picture/still picture may be either a relative address or an absolute address. Further, when it is previously determined that only the sound data is handled or only image data is handled as the multimedia data, the flags F1 and F2 may be not required.

FIG. 6 is an explanatory view of the retrieval range. In this embodiment, it is possible to select the range to be retrieved in the multimedia data. For example, when the retrieval range is designated for "A", all data, i.e., the character text data, the character-string in the animated picture data (title, etc.), the comment in the animated picture data, the character-string in the sound data (title, etc.), the comment in the sound data (the contents of the sound), the character-string in the still picture data (title, etc.), and the comment in the still picture data, become the object of the retrieval.

When the retrieval range B is designated, only the character text data are retrieved. When the retrieval range C is designated, all data except for the character text data are retrieved. Simultaneously, when each of retrieval ranges D to N is designated, it is possible to select the retrieval objects in accordance with various sets of objects.

FIG. 7 shows one a structural example of the state managing storage unit 23. By providing plural kinds of the occurrence frequency tables 22 and the next occurrence position tables 25 in accordance with kinds of retrieval ranges shown in FIG. 6, it is possible to perform high speed retrieval within the designated retrieval range by using the corresponding occurrence frequency table 22 and the next occurrence position table 25.

In this case, when providing the occurrence frequency table 22 and the next occurrence position table 25 for each of retrieval ranges A to N, it is necessary to provide the very large storage capacity. Accordingly, the retrieval range may be restricted so as to provide the occurrence frequency table 22 and the next occurrence position table 25 in accordance with the storage capacity which can be used.

As shown in FIG. 7, the state managing storage unit 23 includes the information of the presence or absence of the occurrence frequency table 22 and the next occurrence position table 25 corresponding to each of the retrieval ranges A to N. When the retrieval range is designated, whether there are the occurrence frequency table 22 and the next occurrence position table 25 included in the designated retrieval range is checked by referencing the state managing storage unit 23. When the occurrence frequency table 22 and the next occurrence position table 25 exist therein, the occurrence frequency table 22 and the next occurrence position table 25 are used. When it does not exist, another occurrence frequency table 22 and the next occurrence position table 25 are used, and the retrieving object data is narrowed down in accordance with kind of multimedia after accessing the retrieving object data 27.

Figure 8:
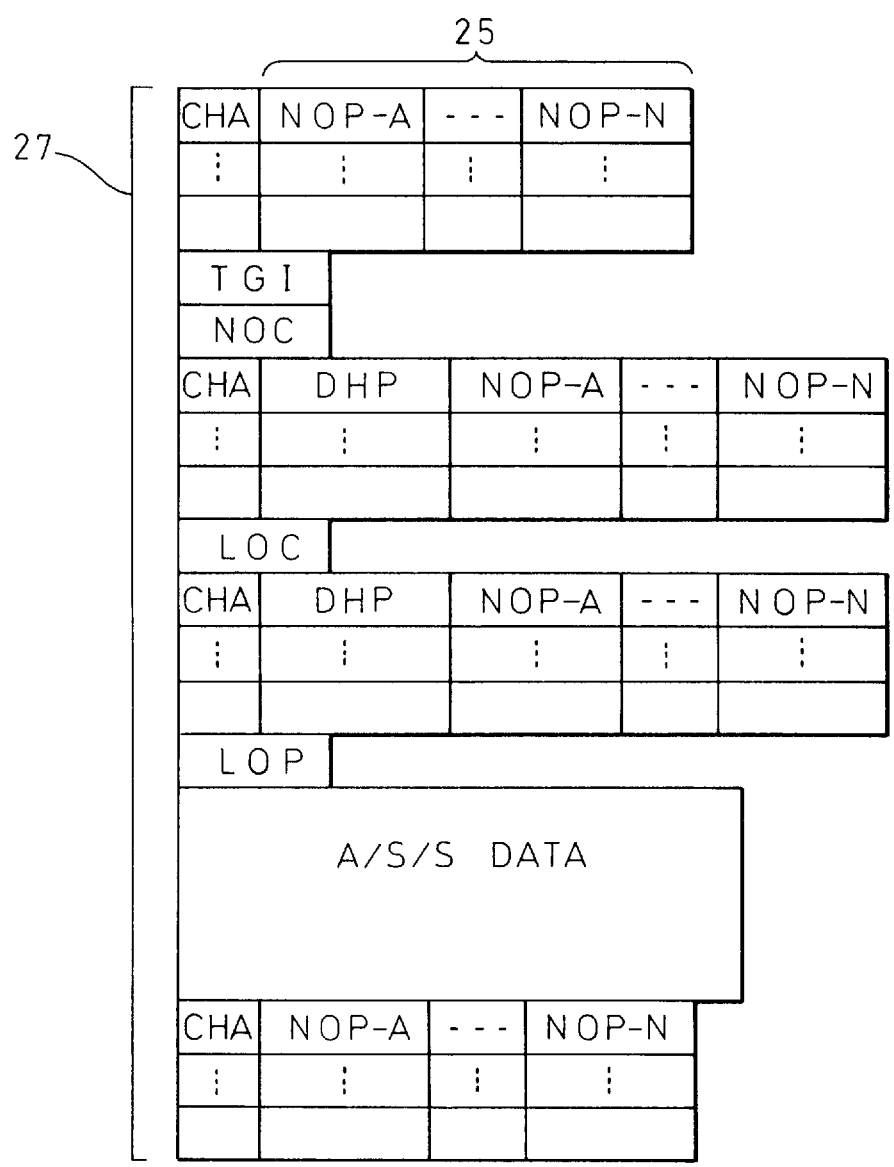
FIG. 8 shows another structural example of the retrieving object data of the present invention.

FIG. 8 shows another structural example of the retrieving object data. In this example, as shown by drawing, the retrieving object data 27 and the next occurrence position table 25 are incorporated, and each entry of the next occurrence position table 25 is added to each character of the retrieving object data 27. The next occurrence position table 25, which is designated by the state managing storage unit 23 shown in FIG. 7 within the retrieval ranges A to N, is added to each character of the retrieving object data 27.

In the drawing, CHA denotes the character, NOP-A to NOP-N denote next occurrence position, TGI denotes the tag information, NOC denotes the number of character, DHP denotes the data head position, LOC denotes the length of comment, and A/S/S DATA denotes the animated picture/sound/still picture data.

Figure 9:
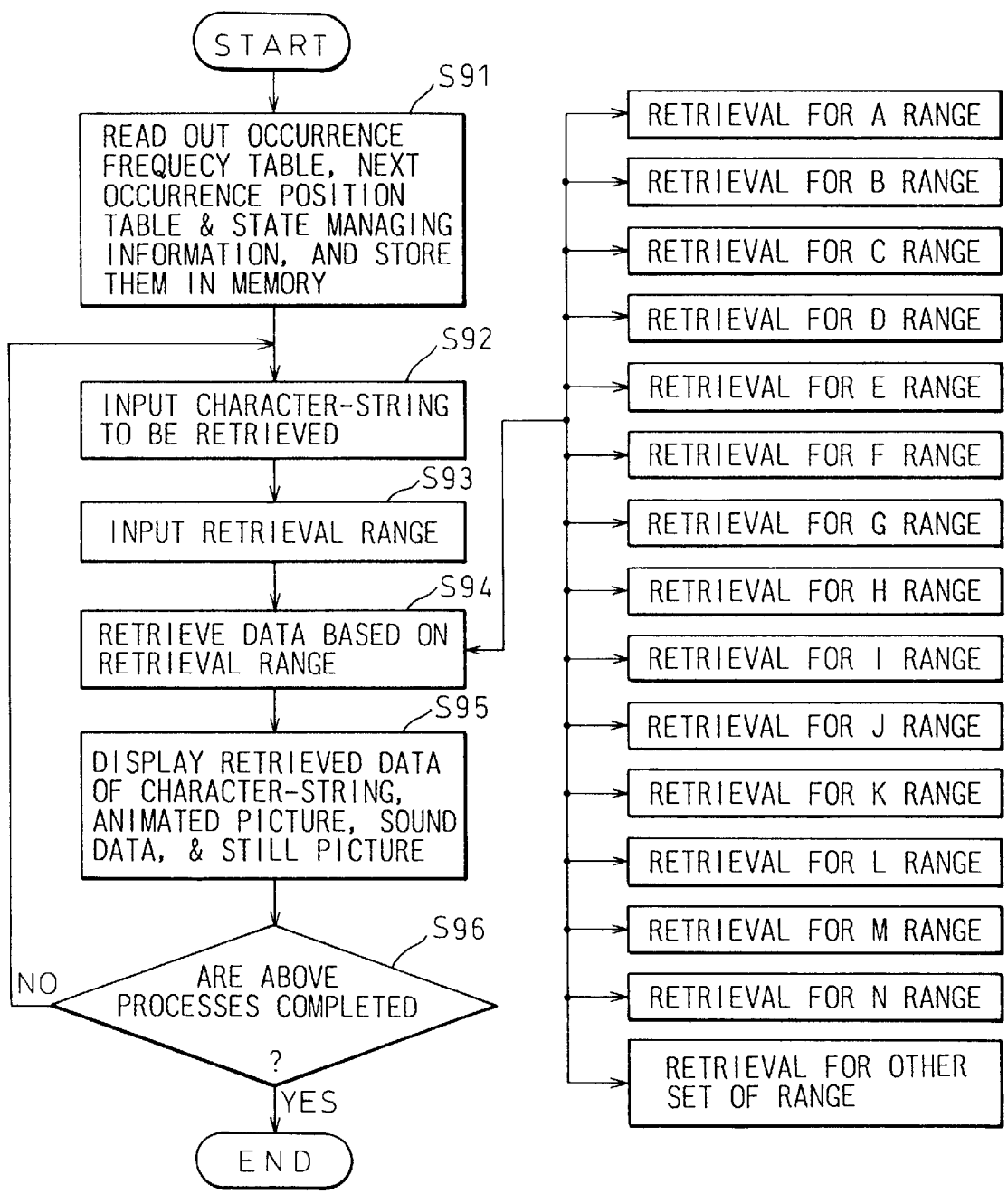
FIG. 9 is a process flowchart according to the present invention.

FIG. 9 is a process flowchart according to the present invention. The process flowchart is explained with reference to FIG. 1.

In step S91, the data included in the occurrence frequency table 22, the next occurrence position table 25 and the state managing storage unit 23 are read out from the data storage device 20, (for example, the CD-ROM) and stored on the memory of the processing device 10. In this case, the above data may be stored in the memory in accordance with necessary timing when retrieving the occurrence frequency table 22, in order to save the memory area, without collectively storing all data to the memory.

In step S92, the retrieval information input unit 11 receives the character-string to be retrieved from the input device 31.

In step S93, the retrieval information input unit 11 receives the retrieval range (a retrieval pattern) from the input device 31 if it is necessary. When the retrieval range is not designated, the retrieval range A shown in FIG. 6 is designated. That is, all data are retrieved.

In step S94, the minimum occurrence frequency detecting unit 12 and the retrieval processing unit 13 retrieve the data in accordance with the retrieval range.

In step S95, when the retrieval is completed, the retrieval result outputting unit 14 executes display of the character-string, display of the animated picture, output of the sound, and output of the still picture. When the retrieval processing unit 13 fails to retrieve the data, the failure is notified to the user.

In step S96, the retrieval result output unit 14 determines as to whether the completion of the retrieval is designated. When the completion of the retrieval is designated (YES), the steps are completed. When the completion of the retrieval is not designated (NO), the process is returned to the step S92 and the same processes are repeated.

Figure 10:
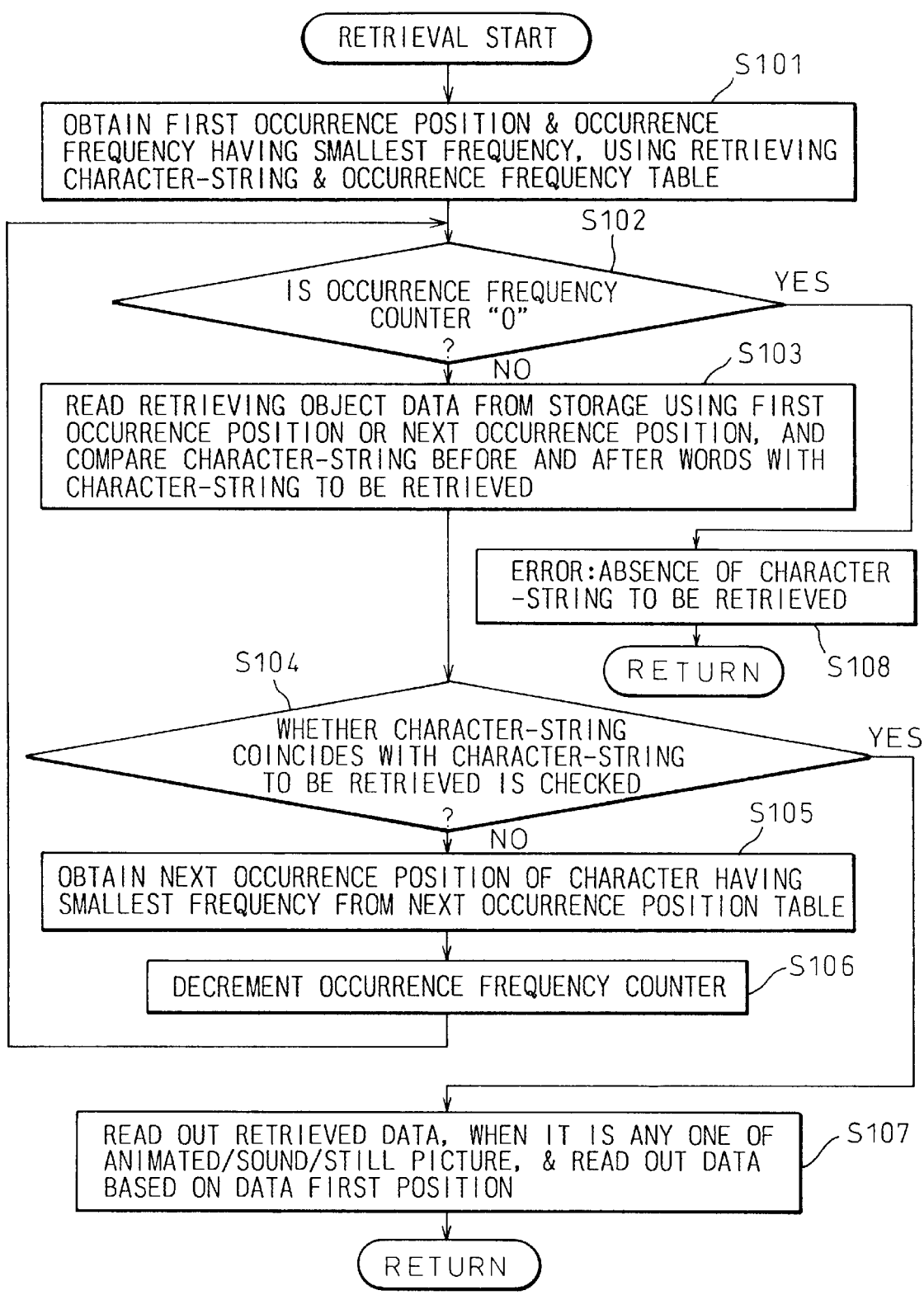
FIG. 10 is a process flowchart for explaining retrieval process according to the present invention.

FIG. 10 is a process flowchart for explaining retrieval process according to the present invention. This flowchart explains in more detail the process of step S94 in FIG. 9. The information of the character-string to be retrieved and the retrieval range are applied by the user.

In step S101, by using the character-string to be retrieved and the occurrence frequency table 22 of the retrieval range, the retrieval processing unit 13 retrieves the character or word having the smallest occurrence frequency within the character-strings to be retrieved, and obtains the first occurrence position and the occurrence frequency of the character. The obtained occurrence frequency is set to the occurrence frequency counter.

In step S102, the retrieval processing unit 13 determines whether a value of the occurrence frequency counter is "0". When the value is not "0" (NO), the process goes to the step S103.

In step S103, by using the address (at first retrieval) of the first occurrence position obtained from the occurrence frequency table 22 and the address (after second retrieval) obtained from the next occurrence position table 25, the retrieval processing unit 13 reads before and after the character-string of the address obtained from the retrieval object data storage unit 26 in the data storage device 20, and compares the character-string with the character-string to be retrieved.

In step S104, the retrieval processing portion 13 determines whether the character-string matches the designated character-string to be retrieved. When the former does not match the latter (NO), the process goes to the step S105.

In step S105, the retrieval processing unit 13 obtains the next occurrence position of the character having the small occurrence frequency within character-strings to be retrieved by retrieving the next occurrence position table 25. After this step, the retrieval processing unit 13 subtracts "1" from the occurrence frequency counter. After this step, the process goes to the step S102, and the same steps are repeated.

When the former coincides with the latter (YES) in step S104, the process goes to the step S107, and the retrieval processing unit 13 reads the data retrieved. When the data is the animated/sound/still picture, the retrieval processing unit 13 obtains the storage position of the animated picture/sound/still picture data and the necessary managing information in accordance with the head position of the data attached to the retrieved character, and reads the real data therefrom. The real data becomes the result of the retrieval and the process returns to a calling source.

When the occurrence frequency counter becomes "0" in the step S102, since there is no character-string which coincides with the character-string to be retrieved, and this becomes "ERROR" and the process returns to the calling source (S108).

When there are no occurrence frequency table 22 and the next occurrence position table 25 which correspond to the designated retrieval range, the retrieval processing unit 13 retrieves the occurrence frequency table 22 and the next occurrence position table 25 having the new retrieval range broader than the designated retrieval range. In this case, the retrieval processing unit 13 may check as to whether the data to be retrieved exists within the retrieval range in the step S104.

Figure 11:
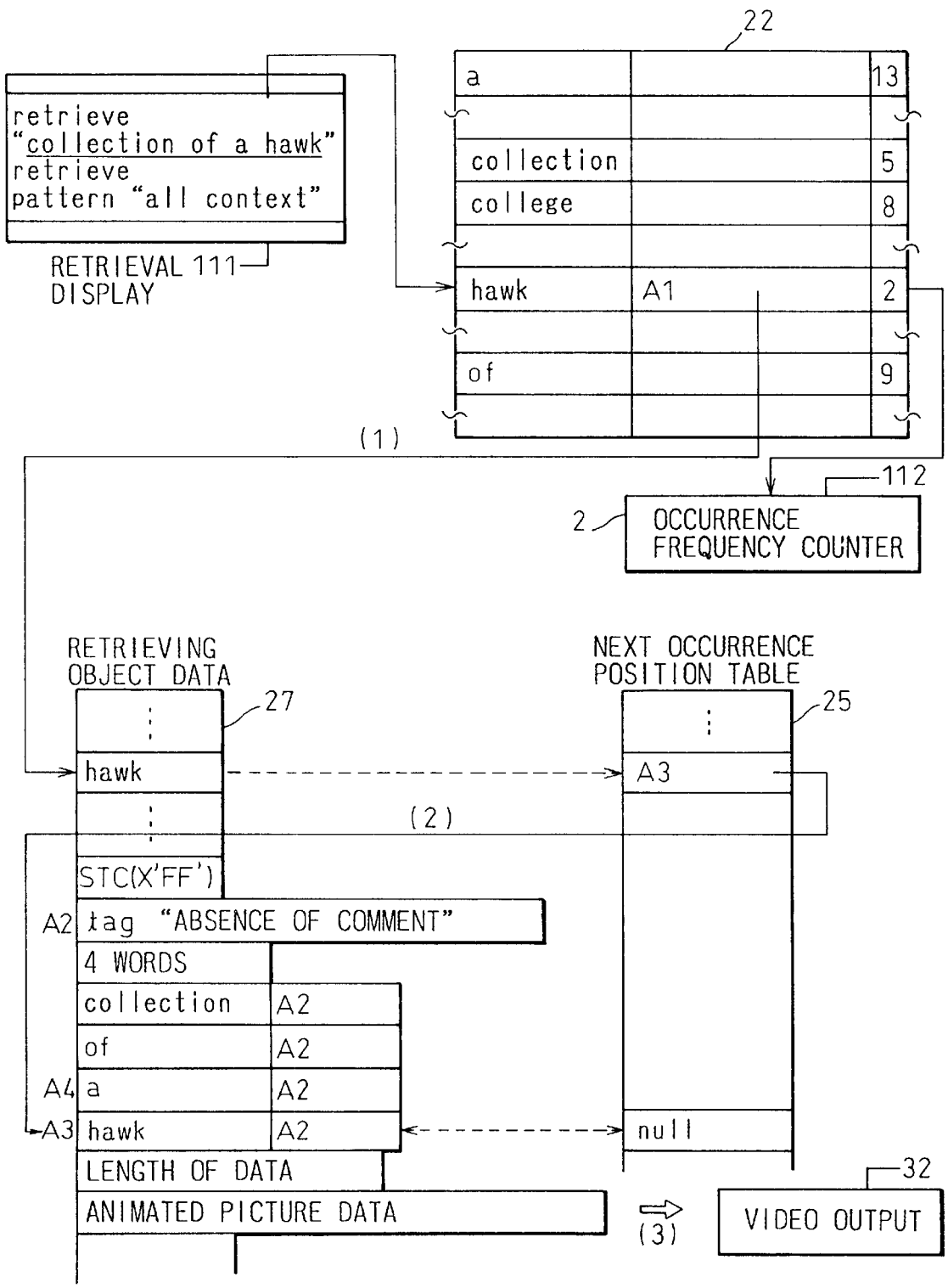
FIG. 11 shows one example of retrieval of the animated data according to the present invention.

FIG. 11 shows one example of the retrieval of the animated data according to the present invention. For example, the retrieving pattern "all context" (this means all retrieving objects including the animated picture/sound/still picture as shown in FIG. 6) is input to the input unit 11 through a retrieved display 111. In this case, the retrieving pattern "all context" corresponds to the retrieval range A in FIG. 6.

Further, for example, when the character-string "collection of a hawk" is provided by the user as the character-string to be retrieved. First, the retrieval processing unit 13 refers to the occurrence frequency table 22 regarding the words "collection", "of", "a", "hawk". The retrieval processing unit 13 checks the occurrence frequency of each word, and extracts the word having the smallest occurrence frequency within the retrieving object data 27.

In this example, as shown in the occurrence frequency table 22, the occurrence frequency "a" is "13", "of" is "9", "collection" is "5", and "hawk" is "2". Accordingly, since the occurrence frequency "hawk" is the smallest, this occurrence frequency "2" is set to an occurrence frequency counter 112. Further, the retrieval processing unit 13 obtains the first occurrence address Al of the word "hawk" from the retrieving object data 27 (see (1)).

The words before and after the address Al are read from the retrieving object data 27, and the read words are verified with the character-string "collection of a hawk". When the read words do not coincide with the "collection of a hawk", the retrieval processing unit 13 refers to a next address A3 of the next occurrence position corresponding to the address Al in the next occurrence position table 25.

Further, the retrieval processing unit 13 subtracts the value "1" from the value of the occurrence frequency counter 112, and reads the words before and after the address A3 from the retrieving object data 27. The retrieval processing unit 13 verifies the words before and after the address A3 with the words "collection of a hawk".

In this case, since the character-string in the retrieving object data 27 coincides with the character-string "collection of a hawk" to be retrieved, the retrieval processing unit 13 obtains the first address A2 of the animated picture data (i.e., tag information of the animated data) from the first position of the "hawk", and displays the character-string as the result of the retrieval on the display unit 32 (see (3)).

Further, as shown in the drawing, a word "null" is recorded in the address corresponding position of the "hawk" in the next occurrence location table 25. This word "null" indicates that the character "hawk" never occurs after the address A3 in the retrieving object data 27.

When the occurrence frequency counter 112 indicates "0" and the character-string to be retrieved is not found, the phrase "failure of retrieval" is displayed on the retrieval display 111.

Figure 12:
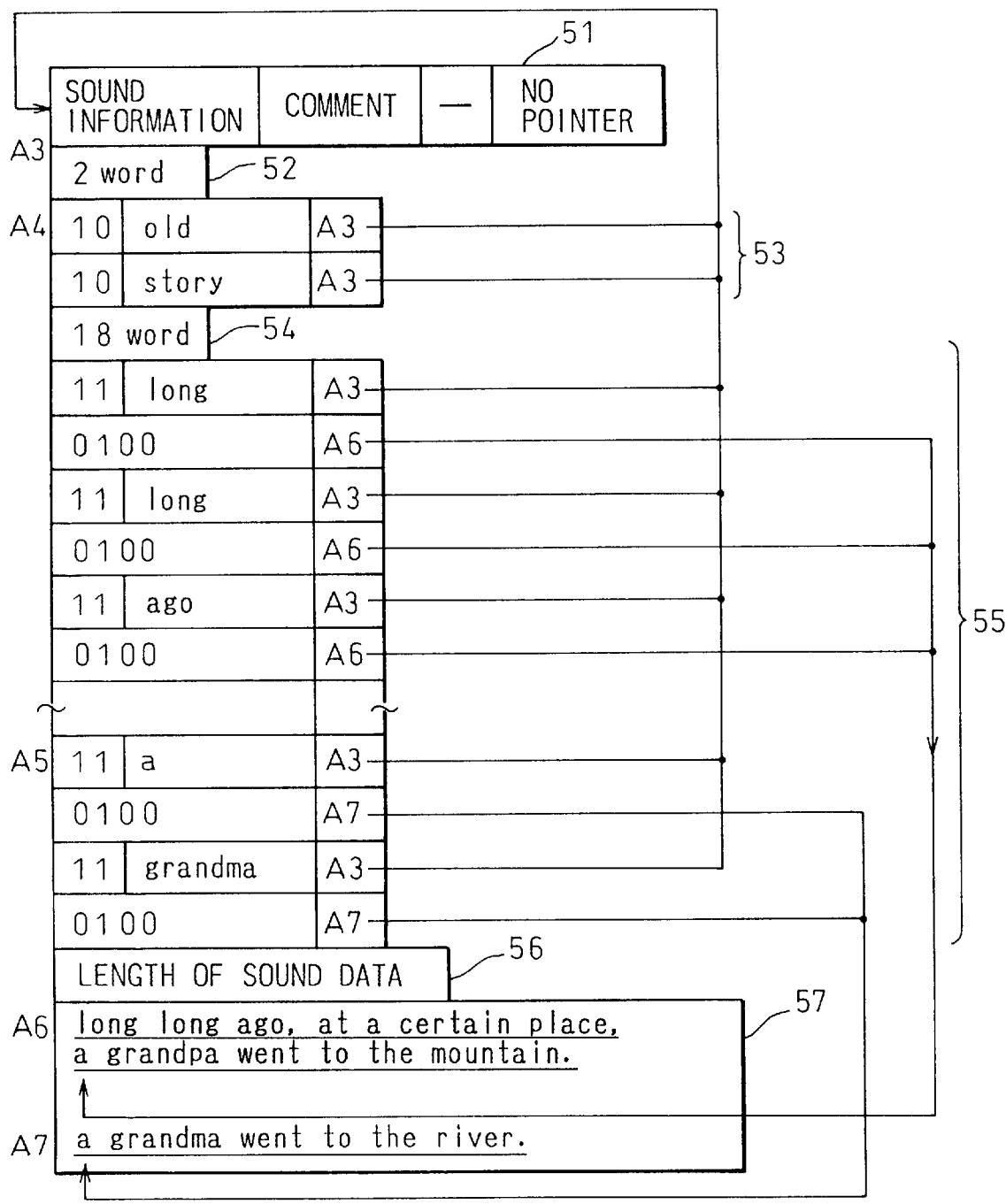
FIG. 12 shows one example of a structure of the sound data according to the present invention.

FIG. 12 shows one example of the structure of the sound data according to the present invention. For example, it is assumed that the sound data "long long ago, at a certain place, a grandpa went to the mountain, and a grandma went to the river" is recorded in the retrieving object data 27. This sound data shows the retrieving object data 27 shown in FIG. 5D.

In FIG. 12, the tag information 51 indicates that the data is the sound, the comment exists, the sound data is directly held in the text and not held by a pointer. The character-string 53 of the character text data, for example, the title, is shown by "old story", and the number 52 of the words is two. Further, the identification flag attached to the character-string is given by "10", and this indicates the information of the data head position. The value of the data head position is the head address A3 which indicates the tag information 51.

The length 54 of the comment is shown by eighteen words, and the information of the sound data are recorded in the comment 55. The identification flags attached to these words are given by "11". These indicate the data head position and the address information of the flags F1 to F4 and the sound data.

For example, the data head position of the word "long" is given by the address A3. Further, the flags F1, F2, F3, F4 attached to the "long" are given by "0 1 0 0". In this case, only F2 is given by "1" and this indicates the address A6 of the sound position information. As shown by the arrow, this address A6 points the head of the real sound data 57, i.e., the word "long".

Figure 13:
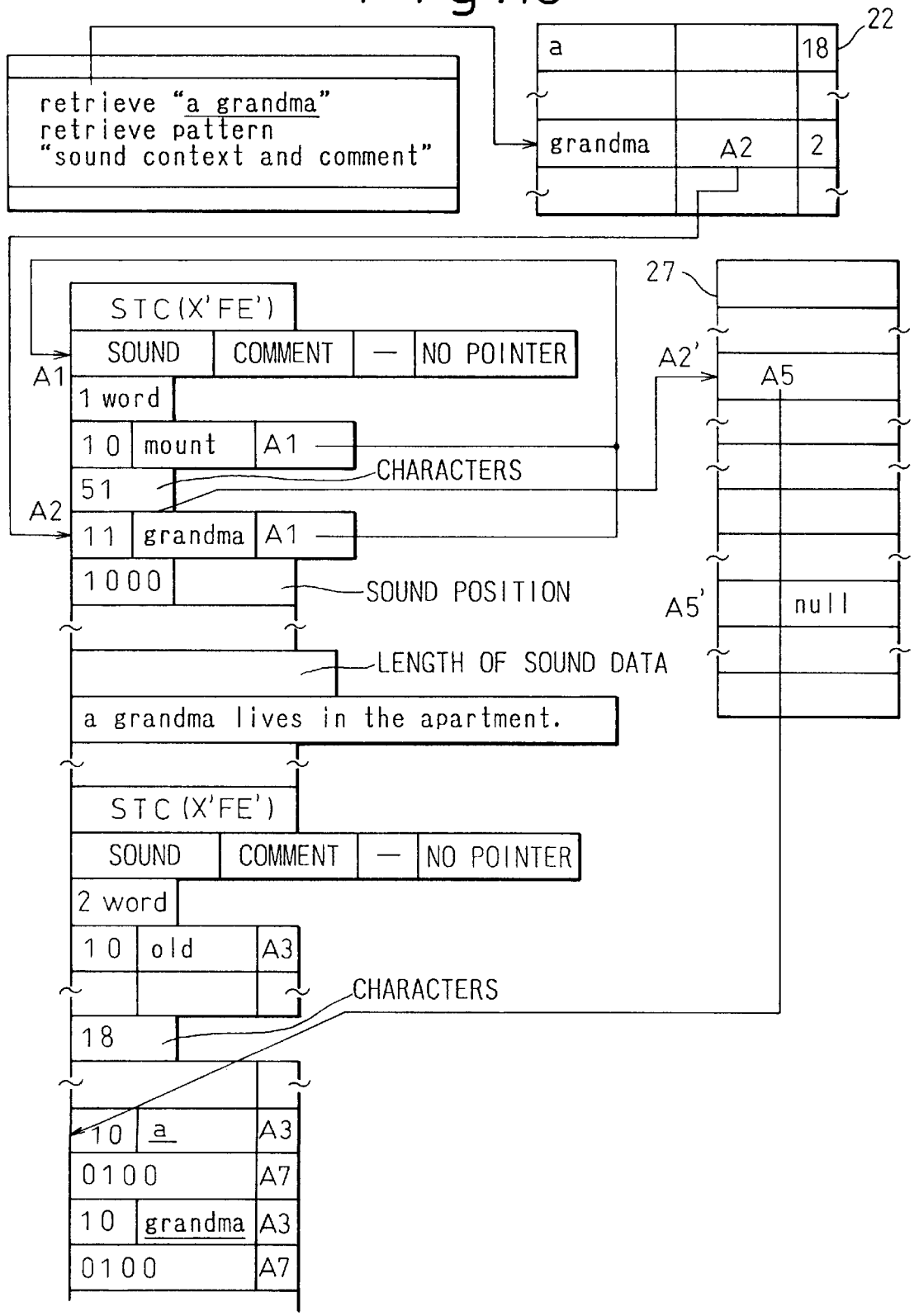
FIG. 13 shows one example of the retrieval of the sound data according to the present invention.

FIG. 13 shows one example of the retrieval of the sound data according to the present invention. The retrieval pattern "sound context and comment" is designated through the retrieval display 111, and "a grandma" is input as the character-string to be retrieved. This retrieving pattern corresponds to the retrieval range I in FIG. 6. Accordingly, the occurrence frequency table 22 and the next occurrence position table 25 are used in the following process.

First, the occurrence frequency of the words "a" and "grandma" is checked from the occurrence frequency table 22, and the word having the smallest occurrence frequency is extracted. In this example, since the occurrence frequency of the "grandma" is smaller than that of the "a", the "grandma" is extracted from the occurrence frequency table 22. Further, the head address A2 is given for the "grandma". The words before and after the address A2 are read from the retrieving object data 27, and are verified with the term, "a grandma". In this verification, the portions except for the words are masked, and only words are verified.

In this retrieval, since the words before and after the address A2 do not match the word to be retrieved, the address of the next occurrence position stored in the address A2', which corresponds to the address A2, is referenced. As shown in the drawing, the next occurrence position address is given by "address A5" in the retrieving object data 27.

Next, the character-string, i.e., the words before and after the address A5 are read from the retrieving object data 27, and verified with the term, "a grandma". In this case, since the words match the term, "a grandma", in the retrieving object data 27, the head address A3 of the sound data (i.e., position of the tag information of the sound data) is obtained from the head position A3 attached to the word "grandma" in the retrieving object data 27. As a result, the character-string "old story" is displayed on the display device 32.

At the same time, the real sound data 57 is read out from the sound data 27 based on the address A7 of the sound position information attached to the term, "grandma", and the sound t "a grandma went to the river" is output from the sound output device 33.

Further, in general, a head of the word and a tail of the word are changed, for example, "pointer", "pointed", "recall", "incorporate", etc. In this case, in the present invention, for example, when the word "point" is registered in the occurrence frequency table 22, the word "point—" is registered as the same word. As another example, when the word "call" is registered, the word "—call" is registered as the same word. Further, when the word "the" is registered, the word "The" is registered as the same word. In this case, for example, when retrieving the word "recall", the occurrence frequency of the word "call" is counted and the smallest occurrence frequency is selected since the word "call" is included in the word "recall".

I claim:

1. An apparatus, comprising:
   a frequency occurrence data table, including:
      all words or characters included in a data object;
      a frequency of occurrence of the words or characters;
      a first occurrence position associated with said words identifying a first location in said data object; and
   a minimum occurrence frequency detecting unit locating a desired word in said frequency occurrence data table and the first occurrence position of said desired word in said data object.

2. A data retrieving apparatus used in a multimedia system including a processing device, a data storage device, an input device, a display device, and a sound output device and said data storage device comprising:
   retrieving object data storage means for storing retrieving object data which includes any one or more animated picture/sound/still picture data, and each of the animated picture/sound/still picture data and sets of these data and a character text picture data including managing information formed by a character-string having a title or comments;
   an occurrence frequency storage means for storing the occurrence frequency of all characters or words included in the retrieving object data and a first occurrence position of each said character or word; and
   next occurrence position storage means for storing the next occurrence position of each character or word;
   further, said processing device comprises:
      retrieving information input means for receiving the character-string to be retrieved from said input device;
      minimum occurrence frequency detecting means operatively connected to said retrieving information input means for detecting a character or word having a minimum occurrence frequency storage means;
      retrieval processing means operatively connected to said detecting means for sequentially obtaining the occurrence position in the retrieving object data as to the character or word detected by said minimum occurrence frequency detecting means from said occurrence frequency storage means or next occurrence position storage means, verifying the character-string positioned after and before the occurrence position with the character-string to be retrieved, and retrieving any one of the character text data, the animated picture data, the sound data, and the still picture data; and
      retrieving result output means operatively connected to said processing means for outputting the retrieved character text data, the animated picture data, the sound data, or the still picture data, in accordance with the kind of media.

3. A data retrieving apparatus as claimed in claim 2, wherein plural kinds of said occurrence frequency storage means and next occurrence position storage means are provided in accordance with the kinds of data, kinds of managing information, or sets of these data; and said minimum occurrence frequency detecting means and retrieval processing means select one of said occurrence frequency storage means and next occurrence position storage means from said plural kinds in accordance with a designated retrieval range.

4. A data retrieving apparatus as claimed in claim 1, wherein said data storage device further comprises state managing storage means for managing the presence or absence of said occurrence frequency storage means and next occurrence position storage means corresponding to kinds of data, kinds of managing information, or sets of these data; and said minimum occurrence frequency detecting means and retrieval processing means select one of said occurrence frequency storage means and next occurrence position storage means from said plural kinds in accordance with the designated retrieval range and managing information of said state managing storage means.

5. A data retrieving apparatus as claimed in claim 2, wherein said managing information attached to the sound data includes data expressed by characters as to the contents of the sound; and said retrieval result outputting means outputs the sound data to said sound output device when the retrieval result includes the data expressed by characters as to the contents of the sound.

6. A data retrieving apparatus as claimed in claim 2, wherein said retrieving object data storage means stores the animated picture data, the sound data or the still picture data in accordance with an order of occurrence frequency in the retrieving object data formed by one consecutive storage area.

* * * * *

UNITED STATES PATENT AND TRADEMARK OFFICE
CERTIFICATE OF CORRECTION

PATENT NO. : 5,857,200
DATED : January 5, 1999
INVENTOR(S) : Yoshifusa TOGAWA

It is certified that error appears in the above-identified patent and that said Letters Patent is hereby corrected as shown below:

Col. 1, line 31, change ";" to --.--;
line 32, change "the" to --The--.

Col. 6, line 27, change "Al14" to --A14--.

Col. 10, line 21, delete "," (first occurrence).

Col. 14, line 42, change "1" to --2--.

Signed and Sealed this

Fifteenth Day of June, 1999

Q. TODD DICKINSON

Attest:

Attesting Officer

Acting Commissioner of Patents and Trademarks